H. J. EVON.
ENVELOP OPENER.
APPLICATION FILED SEPT. 14, 1908.
973,347.
Patented Oct. 18, 1910.
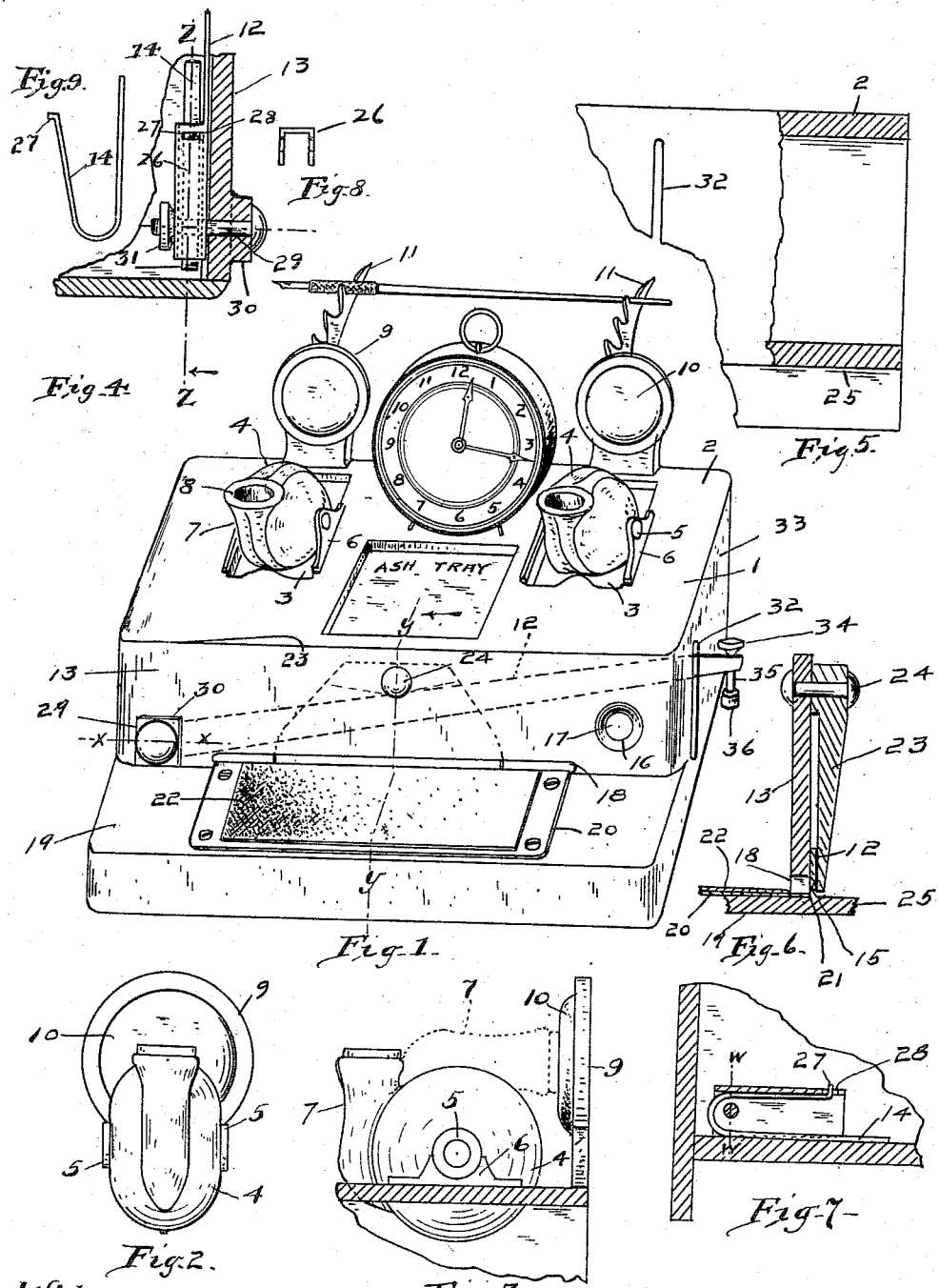
Witnesses:
John R. Sourby
W. C. Smith
Inventor:
Henry J. Evon
By Joshua R. H. Potts
Attorney

UNITED STATES PATENT OFFICE.

HENRY J. EVON, OF CHICAGO, ILLINOIS.

ENVELOP-OPENER.

973,347.  Specification of Letters Patent.  Patented Oct. 18, 1910.

Application filed September 14, 1908. Serial No. 452,918.

*To all whom it may concern:*

Be it known that I, HENRY J. EVON, a citizen of the United States, residing at Chicago, county of Cook, and State of Illinois, have invented certain new and useful Improvements in Envelop-Openers, of which the following is a specification.

My invention relates to envelop openers, and has for an object to provide an improved article of this character which may be operated to accurately cut the envelop at one edge thereof without mutilation in any way to its contents.

My invention will be more readily understood by reference to the accompanying drawings forming a part of this specification, and in which, Figure 1 is a perspective view of my improved device, Fig. 2 is a front elevation of the pivoted ink-well and its stationary closing member, Fig. 3 is a side elevation of the same, Fig. 4 is a horizontal section on the line $x$—$x$ of Fig. 1 showing the spring-raised cutting lever, Fig. 5 is a partial right-hand end view of the device shown in Fig. 1, parts being broken away to show the interior construction, Fig. 6 is a vertical section on the line $y$—$y$ of Fig. 1, Fig. 7 is a vertical section on the line $z$—$z$ of Fig. 4, Fig. 8 is a vertical section on the line $w$—$w$ of Fig. 7, and Fig. 9 is a detail of the spring used to raise the cutting lever.

In the drawings, 1 is a stand or frame preferably of wood, on which the different parts are mounted. The top 2 of the frame is provided with openings 3 for the reception of the pivoted ink-wells 4. Each ink-well is provided with integral trunnions 5 mounted in bearings 6 secured near the sides of the openings 3. Each ink-well is also provided with an off-set neck 7 having a bore or opening 8 communicating with the interior of the ink-well.

9 is an upright support secured in any suitable manner to the top of the frame at the rear of the opening 3. This support is provided in front with a facing 10 of any suitable material as soft rubber.

To close the opening 8, the ink-well is rotated on its trunnions until the end of the neck 7 comes in contact with the soft facing 10 as shown in broken lines in Fig. 3. The weight of the ink-well is so distributed that it will be held by gravity in either a closed or opened position. The front edge of the opening 3 acts as a stop to prevent the ink-well from rotating too far forward by contacting with a portion of the off-set neck 7.

It will be seen that I have thus provided an ink-well which can be opened and closed very quickly doing away with the inconvenience attending the use of the ordinary ink-well due to the stopper being mislaid.

The top of the frame is also provided with suitable supports 11 forming a pen-rack.

12 is a lever pivoted at one end to the rear side of the front wall 13 of the frame. A spring 14 normally holds the lever 12 in a raised position. The lever is provided with a lower shearing edge 15 which coöperates with the shearing edge 16 of the aperture 17 provided in the wall 13 to form a cigar-cutter. The wall 13 is also provided with a longitudinal slot 18 adapted for the insertion of the edge of a letter as hereinafter described.

19 is a horizontal shelf projecting forwardly from the wall 13 below the slot 18, to which is secured a metal plate 20 provided at its rear with a shearing edge 21 which coöperates with the shearing edge 15 of the cutting lever to form a letter-opener as shown in Figs. 1 and 6.

I have shown the strip 22 of some soft material as corduroy velvet secured to the plate 20 to prevent the letters from being marred by contacting with the metal plate. A stop 23 tapering in cross section, as I have shown in Fig. 6, is secured to the wall 13 of the frame by means of a rivet 24, and projects downwardly at the rear of the slot 18 to prevent the letter being inserted too far through the slot.

25 is a horizontal partition projecting rearwardly from the front wall 13 below the slot 18 forming a receptacle for the cigar and letter clippings. The rear of this receptacle is open as shown in Fig. 5, to allow the removal of these clippings. The stop 23 does not extend downwardly far enough to prevent the letter clippings from passing between it and the partition 25.

The pivoted end of the cutting lever is formed with a part 26 U-shaped in cross section as shown in Fig. 8 which acts as a keeper and housing for the U-shaped spring. The spring has its movable end bent upward as at 27 and inserted through a slot 28 formed in the upper part of the housing 26 to retain it in place. The lever is pivoted to the frame by means of the bolt 29 which passes through a reinforced portion 30 of the frame and thence through the side walls of the housing 26. A nut 31 retains the lever in place. The free end of the lever passes through a slot 32 in the end wall 33 of the frame and is provided with an operating handle 34.

The operation of the letter-opener is as follows: The edge of the letter to be opened is inserted through the slot 18 until it contacts with the stop 23 the cutting lever which is normally held in a raised position by the spring 14 is pressed down by means of the operating handle 34 and the edge of the envelop is sheared off between the shearing edges 21 and 15, the edge which is sheared off passing between the lower edge of the stop 23 and the horizontal partition 25 to the receptacle in the rear. The downward movement of the operating lever is limited by means of the stop 35 provided with a tip or cushion 36 of rubber or some elastic material secured to the free end of the cutting lever. The cushion 36 by coming in contact with the desk or table on which the frame rests limits the downward movement of the cutting lever. The frame itself is thus relieved from the jolting and jarring which it would receive if the downward movement of the lever were limited by a stop placed in the frame.

It will be seen that in my improved device I have arranged in a compact manner the different articles necessary in a device of this character and have made various improvements in the details and manner of construction.

Having described my invention what I claim as new and desire to secure by Letters Patent, is:

1. In a device of the character described, a frame adapted to rest on a desk comprising top, bottom, front and end walls forming a chamber open at the rear for the reception of clippings, a lever having a shearing edge pivoted to the front wall within the chamber, the front wall having a slot adapted for the insertion of letters to be opened, a shelf adapted to support a letter projecting forwardly from the front wall below the slot, a member secured to the frame provided with a shearing edge adapted to coöperate with the shearing edge of the lever to open a letter, a stop secured to the frame behind the lever and adapted to limit the distance which a letter can be inserted, the end wall having a slot, the free end of the lever projecting through and working in the slot, and a cushioned stop secured to the free end of the lever adapted to limit its downward movement by coming in contact with the desk, substantially as described.

2. In a device of the character described, a frame, a lever pivoted to said frame, said lever having a shearing edge, a member having a shearing edge adapted to coöperate with the shearing edge of the lever to open a letter, the pivoted end of the lever being bent to form a housing having upper and side walls, the upper wall being provided with a slot and a U-shaped spring contained within the housing adapted to maintain the lever in a raised position, one end of the spring being bent and inserted through the slot in the housing, substantially as described.

3. In a device of the character described, a frame adapted to rest on a desk, a lever pivoted to said frame, said lever having a shearing edge, a member having a shearing edge adapted to coöperate with the shearing edge of the lever to open a letter, the free end of said lever being provided with a cushioned stop adapted to limit the downward movement of the lever by coming in contact with the desk, substantially as described.

In testimony whereof I have signed my name to this specification in the presence of two subscribing witnesses

HENRY J. EVON.

Witnesses:
ANNA L. EKVALL,
HELEN F. LILLIS.